# (12) United States Patent
Garcia et al.

(10) Patent No.: US 10,458,051 B2
(45) Date of Patent: Oct. 29, 2019

(54) FINISHING COMPOSITION FOR PAINTABLE CLOTH AND PRODUCTS OBTAINED

(71) Applicant: SAINT-GOBAIN ADFORS, Courbevoie (FR)

(72) Inventors: Alexandre Garcia, Paris (FR); Alexandra Dekoninck, Eaubonne (FR)

(73) Assignee: SAINT-GOBAIN ADFORS, Courbevoie (FR)

( * ) Notice: Subject to any disclaimer, the term of this patent is extended or adjusted under 35 U.S.C. 154(b) by 0 days.

(21) Appl. No.: 16/069,042

(22) PCT Filed: Jan. 11, 2017

(86) PCT No.: PCT/FR2017/050054
§ 371 (c)(1),
(2) Date: Jul. 10, 2018

(87) PCT Pub. No.: WO2017/121952
PCT Pub. Date: Jul. 20, 2017

(65) Prior Publication Data
US 2019/0048498 A1   Feb. 14, 2019

(51) Int. Cl.
| | | |
|---|---|---|
| *D03D 15/00* | (2006.01) | |
| *D06N 3/12* | (2006.01) | |
| *C09D 5/00* | (2006.01) | |
| *C09D 167/00* | (2006.01) | |
| *D06M 15/507* | (2006.01) | |
| *D06N 3/00* | (2006.01) | |
| *C08K 5/00* | (2006.01) | |
| *C08K 5/092* | (2006.01) | |
| *C08L 1/10* | (2006.01) | |
| *C08L 71/00* | (2006.01) | |
| *D06N 3/02* | (2006.01) | |
| *D06N 3/04* | (2006.01) | |
| *D03D 1/00* | (2006.01) | |
| *C09D 171/00* | (2006.01) | |
| *D06M 11/68* | (2006.01) | |
| *D06M 13/148* | (2006.01) | |
| *D06M 13/192* | (2006.01) | |
| *D06M 13/224* | (2006.01) | |
| *D06M 15/07* | (2006.01) | |
| *C09D 7/40* | (2018.01) | |
| *C09D 7/63* | (2018.01) | |
| *C09D 7/43* | (2018.01) | |

(52) U.S. Cl.
CPC ........ *D03D 15/0011* (2013.01); *C08K 5/0016* (2013.01); *C08K 5/092* (2013.01); *C08L 1/10* (2013.01); *C08L 71/00* (2013.01); *C09D 5/002* (2013.01); *C09D 7/40* (2018.01); *C09D 7/63* (2018.01); *C09D 167/00* (2013.01); *C09D 171/00* (2013.01); *D03D 1/00* (2013.01); *D06M 11/68* (2013.01); *D06M 13/148* (2013.01); *D06M 13/192* (2013.01); *D06M 13/2243* (2013.01); *D06M 15/07* (2013.01); *D06M 15/507* (2013.01); *D06N 3/0006* (2013.01); *D06N 3/0022* (2013.01); *D06N 3/0063* (2013.01); *D06N 3/0079* (2013.01); *D06N 3/0088* (2013.01); *D06N 3/02* (2013.01); *D06N 3/042* (2013.01); *D06N 3/045* (2013.01); *D06N 3/123* (2013.01); *C08G 2650/54* (2013.01); *C09D 7/43* (2018.01); *D10B 2101/06* (2013.01); *D10B 2321/021* (2013.01); *D10B 2321/022* (2013.01)

(58) Field of Classification Search
CPC .... C09D 5/002; C09D 167/00; C09D 171/00; C09D 7/40; C09D 7/43; C09D 7/63; C08K 5/0016; C08K 5/092; C08G 2650/54; C08L 1/10; C08L 71/00; D03D 15/0011; D03D 1/00; D06N 3/123; D06N 3/0006; D06N 3/0022; D06N 3/0063; D06N 3/0079; D06N 3/0088; D06N 3/02; D06N 3/042; D06N 3/045; D06M 15/507; D06M 11/68; D06M 13/148; D06M 13/192; D06M 13/2243; D06M 15/07; D10B 2101/06; D10B 2321/021; D10B 2321/022
See application file for complete search history.

(56) References Cited

U.S. PATENT DOCUMENTS

| | | | | | |
|---|---|---|---|---|---|
| 4,207,073 | A | * | 6/1980 | Petersen | D06M 15/564 252/8.61 |
| 4,314,806 | A | * | 2/1982 | Petersen | D06M 15/423 524/598 |

(Continued)

FOREIGN PATENT DOCUMENTS

| | | |
|---|---|---|
| JP | 58-91775 A | 5/1983 |
| WO | WO 2012/138723 A1 | 10/2012 |

(Continued)

OTHER PUBLICATIONS

International Search Report dated Apr. 12, 2017, in PCT/FR2017/050054 filed Jan. 11, 2017.

*Primary Examiner* — Anthony J Green
(74) *Attorney, Agent, or Firm* — Oblon, McClelland, Maier & Neustadt, L.L.P.

(57) ABSTRACT

An aqueous finishing composition includes at least one polyglycerol, at least one organic polycarboxylic acid containing at least three carboxyl groups, at least one esterification catalyst, at least one plasticizer, and at least one thickener selected from a group consisting of cellulose derivatives, succinoglycans and xanthans.

18 Claims, No Drawings

(56) References Cited

U.S. PATENT DOCUMENTS

| | | | |
|---|---|---|---|
| 5,273,549 A | * | 12/1993 | Didier ................. D06M 13/288 |
| | | | 8/116.1 |
| 2009/0068416 A1 | | 3/2009 | Noda et al. |
| 2014/0038485 A1 | | 2/2014 | Anderson et al. |
| 2015/0152244 A1 | | 6/2015 | Hernandez-Torres |
| 2016/0177502 A1 | | 6/2016 | Garcia et al. |

FOREIGN PATENT DOCUMENTS

| WO | WO 2014/024939 A1 | 2/2014 |
|---|---|---|
| WO | WO 2015/004404 A1 | 1/2015 |

* cited by examiner

FINISHING COMPOSITION FOR PAINTABLE CLOTH AND PRODUCTS OBTAINED

The present invention relates the field of paintable cloths consisting of a woven fabric based on inorganic yarns, in particular glass yarns, or organic yarns, and a finish, which are intended to be used as a wallcovering for buildings, particularly for residential use.

The invention relates more particularly to an aqueous finishing composition capable of crosslinking under the effect of heat which contains a polyglycerol, an organic polycarboxylic acid, a crosslinking catalyst, a plasticizer and a thickener.

The manufacture of paintable cloths generally comprises a step that consists in weaving yarns, for example glass yarns, in order to form a woven fabric, followed by the application of an aqueous finishing composition to the woven fabric formed, then by a heat treatment in order to eliminate water. In the paintable cloth thus obtained, the finish bonds the glass yarns together and at least partially conceals the mesh opening of the woven fabric. The paintable cloth obtained has a high dimensional stability that enables it to withstand the various handling operations essential for its installation such as the cutting into lengths, the glueing to the support and the application of paint.

The finishing compositions conventionally used are aqueous solutions or dispersions that contain one or more starches and polymers containing (meth)acrylic acid or (meth)acrylate residues, and optionally various additives. During the heat treatment, these finishing compositions emit sizeable amounts of volatile organic compounds (VOCs), including formaldehyde, which are found in the gases of the chimneys of the production site.

The increasingly restrictive regulations in regard to protection of operators and of the environment requires paintable cloth manufacturers to seek solutions that make it possible to further lower the levels of VOC emissions and consequently to reduce the flue gas treatment costs.

The invention is very particularly interested in obtaining an aqueous finishing composition with low emissions of VOCs, and more particularly of formaldehyde, which can be applied to both faces of the glass fabric by means of a "screen-to-screen" device. This device, described in particular in WO 2010/070248, consists of two rollers each comprising a central pipe for introducing the finishing composition under pressure and perforations in the peripheral zone of each roller through which said composition passes, which composition is deposited by contact on each face of the woven fabric. This device requires a finishing composition having particular rheological properties, in particular a controlled viscosity so that the application takes place uniformly on each face of the paintable cloth.

Thus, the aqueous finishing composition according to the present invention possesses rheological properties suitable for the "screen-to-screen" application method, has the ability to crosslink under the effect of heat while emitting a small amount of volatile organic compounds (VOCs), in particular formaldehyde and has improved mechanical properties, in particular a good compromise between the tensile strength and the bending stiffness.

The aqueous finishing composition according to the invention comprises:
- at least one polyglycerol,
- at least one organic acid containing at least three carboxyl groups,
- at least one esterification catalyst,
- at least one plasticizer, and
- at least one thickener.

The polyglycerol in accordance with the invention is a glycerol oligomer having a degree of polymerization of between 2 to 20, preferably of 2 to 10 and better still of 2 to 8. Preferably, diglycerol or a mixture of polyglycerols containing at least 50% by weight of diglycerol, triglycerol and tetraglycerol, and advantageously a mixture of diglycerol and triglycerol, is chosen.

In the finishing composition, the polyglycerol represents 10% to 60%, preferably 20% to 50% and advantageously 20% to 45% of the total weight of the solids.

The organic acid in accordance with the invention comprises at least three carboxyl groups, which groups are capable of reacting with the hydroxyl groups of the polyglycerol under the effect of heat to form ester bonds which lead to a polymeric network being obtained in the final organic binder.

The organic acid contains 3 to 15, and preferably 3 or 4 carboxyl groups.

For the sake of simplicity, "organic acid comprising at least three carboxyl groups" is referred to as "organic polycarboxylic acid" in the remainder of the text.

The organic polycarboxylic acid may be in the form of an organic acid monomer or an organic acid polymer.

Preferably, the organic polycarboxylic acid is a monomer and it is in the form of a saturated or unsaturated, branched or unbranched acyclic acid, a cyclic acid or an aromatic acid. Generally, the organic polycarboxylic acid has a number-average molar mass of less than or equal to 1000, preferably less than or equal to 750, advantageously less than or equal to 500 and better still greater than 180.

By way of examples, mention may be made of tricarboxylic acids such as citric acid, tricarballylic acid, 1,2,4-butanetricarboxylic acid, aconitic acid, hemimellitic acid, trimellitic acid and trimesic acid, and tetracarboxylic acids such as 1,2,3,4-butanetetracarboxylic acid (BTCA) and pyromellitic acid. Citric acid and 1,2,3,4-butanetetracarboxylic acid are preferred.

In the finishing composition, the organic polycarboxylic acid represents 10% to 50%, preferably 15% to 40% of the total weight of the solids.

The organic polycarboxylic acid represents 10% to 80%, preferably 20% to 70%, and advantageously 30% to 65% of the weight of the mixture formed by the polyglycerol and the organic polycarboxylic acid.

The role of the esterification catalyst is to increase the rate of the reaction between the polyglycerol and the organic polycarboxylic acid.

The esterification catalyst may be chosen from Lewis acids and bases such as clays, colloidal or non-colloidal silica, organic amines, quaternary amines, metal oxides, metal sulfates, metal chlorides, urea sulfates, urea chlorides and silicate-based catalysts.

The esterification catalyst may also be a compound containing phosphorus, for example an alkali metal hypophosphite salt, an alkali metal phosphite, an alkali metal polyphosphate, an alkali metal hydrogen phosphate, a phosphoric acid or an alkylphosphonic acid. Preferably, the alkali metal is sodium or potassium.

The esterification catalyst may also be a compound containing fluorine and boron, for example tetrafluoroboric acid or a salt of this acid, in particular an alkali metal tetrafluoroborate such as sodium or potassium tetrafluoroborate, an alkaline-earth metal tetrafluoroborate such as calcium or magnesium tetrafluoroborate, a zinc tetrafluoroborate and an ammonium tetrafluoroborate.

Preferably, the esterification catalyst is sodium hypophosphite, sodium phosphite and mixtures of these compounds, and advantageously sodium hypophosphite.

In the finishing composition, the esterification catalyst represents 2% to 10%, preferably 4% to 8% of the total weight of the solids.

The esterification catalyst represents 0.5% to 25%, preferably 5% to 20%, and advantageously 7% to 16% of the weight of the mixture formed by the polyglycerol and the organic polycarboxylic acid.

The plasticizer according to the invention is chosen from compounds that limit the interactions between the components of the final finish thus giving it greater suppleness and flexibility.

The plasticizer is a polyester, particularly a dialkyl ester of a fatty acid, for example di-n-butyl sebacate; a diester of isosorbide and of fatty acid(s), particularly plant-based fatty acids, in particular Polysorb® ID 46 sold by Roquette; an acetylated monoglyceride of a hydroxylated fatty acid, particularly 12-hydroxystearic acid, in particular Grindsted® Soft-N-Safe sold by Danisco; and a dimer-based polyester polyol, in particular Priplast® 1901 sold by Croda.

In the finishing composition, the plasticizer represents 0.5% to 50%, preferably 5% to 40%, and advantageously 10% to 35% of the total weight of the solids.

The role of the thickener is to adjust the viscosity of the finishing composition to enable the application thereof with the screen-to-screen device. In addition, it has been observed that the thickener is essential in order for the paintable cloth to be able to have an acceptable tensile strength.

The thickener is chosen from cellulose derivatives, such as carboxyalkyl celluloses, in particular carboxymethyl celluloses, and hydroxyalkyl celluloses, in particular hydroxyethyl methyl celluloses, succinoglycans and xanthans. Carboxymethyl celluloses are preferred.

In the finishing composition, the thickener represents 0.5% to 25%, preferably 2% to 20%, and advantageously 3% to 17% of the total weight of the solids.

The finishing composition may additionally comprise the conventional additives below, in the following proportions expressed as a percentage of the solids:

0 to 15% of pigments, particularly of white color such as $TiO_2$, and 0 to 20% of a compound capable of reacting with formaldehyde, particularly acetoacetamide or adipic acid dihydrazide.

The aqueous finishing composition does not contain any polyol other than the polyglycerols and the polyester polyols used as plasticizer.

The water generally represents 70% to 95%, preferably 85% to 92% of the weight of the aqueous finishing composition.

As indicated above, the aqueous finishing composition is intended to be applied to a woven fabric to form a paintable cloth intended to be applied to a wall support or a ceiling. The paintable cloth constitutes another subject of the invention.

The woven fabric forming the paintable cloth comprises inorganic yarns, preferably glass yarns, and/or organic yarns, in particular formed of at least one polymer or obtained from plant fibers.

Preferably, the woven fabric is obtained from glass yarns composed of a multitude of glass filaments (or strands) or derivatives of these yarns, in particular the assemblies of these strands as rovings, or blended yarns comprising at least one glass yarn composed of a multitude of glass filaments and at least one yarn composed of a multitude of filaments of a thermoplastic organic material such as polyethylene or polypropylene, or else "co-mingled" yarns formed of glass filaments and filaments of the aforementioned thermoplastic organic material which are intimately mixed.

The aforementioned yarns may be non-twisted yarns or twisted yarns.

The glass incorporated in the composition of the yarns may be of any type, for example E, C and AR (alkali-resistant) glass. E glass is preferred.

The diameter of the glass filaments forming the yarns may vary to a large extent, for example from 5 to 30 μm. In the same way, great variations may occur in the linear density of the yarn, which may range from 34 to 1500 tex.

Advantageously, the paintable cloth comprises, as warp, a twisted glass yarn (textile yarn) and, as weft, a non-twisted glass yarn that has undergone a treatment that aims to separate the glass filaments so as to give them volume (or "volumized" yarn). The linear density of the warp and weft yarns preferably is comprised between 50 and 500 tex.

Preferably, the paintable cloth has a surface weight of from 30 to 1000 g/m².

The amount of the finish represents 15% to 40%, preferably 20% to 35% of the weight of the final paintable cloth.

The manufacture of the paintable cloth according to the invention may be carried out in a conventional facility of the type described in the aforementioned WO 2010/070248.

In this facility, the woven fabric unwound from a reel passes into a screen-to-screen device that makes it possible to deposit the finishing composition on both faces of the woven fabric, then into a device that makes it possible to eliminate the water and to crosslink the constituents of said composition in order to form the final finish.

The screen-to-screen device consists of two rollers each comprising a central pipe for introducing the finishing composition under pressure. The peripheral zone of the rollers is provided with perforations, through which the finishing composition passes, which composition is deposited on each face of the woven fabric.

The drying device may consist of a series of rollers heated to an identical temperature or to different temperatures, and preferably the first roller is heated to a temperature above that of the last roller.

The maximum temperature to be applied to the first roller depends on the nature of the yarns that form the woven fabric. For example, the temperature of the first roller is equal to 240° C. and that of the last roller is equal to 110° C. when all of the yarns are made of glass.

Other drying devices may be used, for example devices that deliver hot air or that operate by infrared radiation.

The finishing composition in accordance with the invention possesses the requisite properties to enable it to also be used in a process in which the screen-to-screen device is replaced by a pad-coating machine. The pad-coating machine is composed of a pair of rollers arranged so that the first, lower roller immerses in a tank containing the finishing composition and the second roller is positioned above the first roller. The amount of finishing composition is regulated by the distance between the two rollers.

According to one variant, the finishing composition may include one or more foaming agents for application by pad-coating in the form of a foam.

The following examples make it possible to illustrate the invention without however limiting it.

In these examples, the tensile strength of the woven fabrics, expressed in N/5 cm, is measured in the cross direction (at 45° with respect to the direction given by the warp yarns) under the conditions of the NF EN ISO 13934-1 standard. The measurement of the tensile strength is carried out after manufacture (TSm) and after an aging treatment (TSa) that consists in immersing the woven fabric in distilled water at 80° C. for 10 minutes.

the water resistance is measured as follows: a sample (length 15 cm; width 5 cm) is cut from the paintable cloth, in the cross direction (at 45° with respect to the direction given by the warp yarns). The sample is suspended from one end and a 500 g weight is attached to the other end. The sample is completely immersed in water. The time, in seconds, that elapses between the immersion and the moment when the sample begins to deform is measured.

the bending stiffness is measured on a rectangular sample (3.8 cm×8.0 cm) cut in the machine direction (with respect to the weaving direction) using a Lorentzen & Wettre apparatus, at 23° C. and 50% relative humidity.

The sample is held vertically at one end in the smallest dimension between two jaws and a horizontal force is applied to the free end. The force applied for a bending angle equal to 5° is measured and the stiffness S (in mN·m) is calculated according to the following formula:

$$S = 60 \times F \times L^2 / \pi \times \theta \times b$$

in which:

F is the force measured to achieve an angle of 5° (in mN)

L is the working length of the sample (0.05 m)

θ is the bending angle (5°)

b is the width of the sample (0.038 m).

EXAMPLES 1 TO 10

An aqueous finishing composition is prepared that contains the constituents that appear in table 1, in amounts expressed as weight percentages.

For comparison purposes, two compositions containing succinic anhydride (comparative example C1) or succinic acid (comparative example C2) and a composition (Reference) containing the following constituents (as weight percentages) are also prepared:

| | |
|---|---|
| Styrene/butyl acrylate copolymer | 5.78 |
| (Acronal ® S996 sold by BASF) | |
| Acrylic ester/acrylonitrile copolymer | 3.40 |
| (Acronal ® LN579S sold by BASF) | |
| Modified potato starch | 1.66 |
| (Amitrolit ® 8900 sold by Agrana) | |
| Wheat starch | 0.58 |
| Ammonium zirconium carbonate | 0.80 |
| (Arkophob ® AZCS sold by Auer Remy) | |
| Calcium carbonate | 3.92 |
| (Hydrocarb ® 90-GU sold by Omya) | |
| Silicone-based softener | 0.37 |
| (Cepolsoft ® SIL sold by Prochimica) | |
| Polyacrylate | 1.65 |
| (Appretan ® 2710 sold by Archroma) | |
| Water | 81.84 |

The finishing composition according to these examples is used to coat a glass fabric having a basis weight equal to 110.2 g/m² formed, as warp, of (twisted) glass textile yarns having a linear density equal to 140 tex with a warped density of 3 yarns per cm and, as weft, (non-twisted) glass yarns having a linear density of 330 tex and a weft density of 1.9 yarns per cm. The amount of finish on the woven fabric is given in table 1.

The application of the finishing composition is carried out by dip coating which consists in immersing the woven fabric in a tank containing said finishing composition then in depositing the woven fabric on a suction belt so as to eliminate the excess finish. The dip-coating application is equivalent to the "screen-to-screen" application mentioned above.

The woven fabric is then placed in a drying oven at 210° C. for 6 minutes, except for the woven fabric coated with the Reference composition which is treated at 200° C.

Table 1 collates the measurements of the tensile strength, after manufacture and after aging, and of the bending stiffness of the paintable cloths according to the invention (examples 1 to 10) and the comparative examples C1 and C2, relative to the Reference example.

Example 1 has the best mechanical performance, with higher tensile strength RTm and RTa than the Reference, and a stiffness that is also higher.

Example 10 has the best compromise with, in addition, an excellent water resistance, comparable to that of the Reference.

The comparative examples C1 and C2 using succinic acid (dicarboxylic acid) have low tensile strength RTm and RTa, insufficient stiffness (the paintable cloth has no strength) and no water resistance.

TABLE 1

| | Ex. 1 | Ex. 2 | Ex. 3 | Ex. 4 | Ex. 5 | Ex. 6 | Ex. 7 | Ex. 8 | Ex. 9 | Ex. 10 | C1 | C2 | Réf. |
|---|---|---|---|---|---|---|---|---|---|---|---|---|---|
| Composition | | | | | | | | | | | | | |
| Diglycerol | 3.09 | 3.41 | 3.53 | 2.83 | 3.98 | 4.13 | 4.20 | 4.39 | 3.66 | 2.13 | 3.78 | 3.45 | — |
| Organic acid | | | | | | | | | | | | | |
| citric acid | 3.79 | 3.30 | 3.13 | 2.31 | 2.44 | — | — | — | — | — | — | — | — |
| BTCA | — | — | — | — | — | 2.34 | 2.23 | 1.95 | 2.23 | 2.34 | — | — | — |
| succinic anhydride | — | — | — | — | — | — | — | — | — | — | 2.86 | — | — |
| succinic acid | — | — | — | — | — | — | — | — | — | — | — | 3.34 | — |
| Sodium hypophosphite | 0.50 | 0.55 | 0.57 | 0.46 | 0.64 | 0.67 | 0.68 | 0.71 | 0.68 | 0.67 | 0.61 | 0.56 | — |
| Plasticizer | | | | | | | | | | | | | |
| acetylated monoglyceride of hydroxystearic acid[1] | 1.60 | 1.10 | 1.14 | 2.73 | 1.29 | 1.33 | 1.36 | 1.42 | 1.36 | 1.33 | 1.22 | 1.11 | — |
| Polyester polyol[2] | — | — | — | — | — | — | — | — | 0.54 | 2.00 | — | — | — |
| Thickener | | | | | | | | | | | | | |
| Carboxymethyl cellulose[3] | 1.60 | 1.60 | 1.59 | 1.59 | 1.61 | 1.49 | 1.49 | 1.49 | 1.49 | 1.49 | 1.49 | 1.50 | — |
| Water | 90.00 | 90.00 | 90.00 | 90.00 | 90.00 | 90.00 | 90.00 | 90.00 | 90.00 | 90.00 | 90.00 | 90.00 | — |
| Amount of finish (% by weight of the paintable cloth) | 32.4 | 33.1 | 33.4 | 33.0 | 31.4 | 31.9 | 32.6 | 30.8 | 32.6 | 31.9 | 28.9 | 31.4 | 34.9 |
| Tensile strength (N/5 cm) | | | | | | | | | | | | | |
| after manufacture RTm | 140 | 66 | 47 | 30 | 28 | 47 | 33 | 28 | 55 | 71 | 11 | 8 | 96 |
| after aging RTa | 19 | 4 | 5 | 5 | 3 | 8 | 5 | 4 | 10 | 32 | 2 | 1 | 17 |
| Bending stiffness (mN · m) | 6.43 | 3.33 | 2.33 | 1.91 | 1.42 | 2.90 | 2.23 | 1.71 | 2.55 | 5.08 | 0.67 | 0.57 | 5.48 |
| Water resistance (s) | n.d. | 17 | n.d. | 3 | 5 | 10 | 7 | 2 | >30 | >30 | 0 | 0 | >30 | n.d.: not determined
[1]Grindsted ® Soft-N-Safe sold by Danisco
[2]Priplast ® 1901 sold by Croda
[3]Finnfix ® 30000 P sold by CP KELCO

The invention claimed is:

1. An aqueous finishing composition, comprising:
   at least one polyglycerol,
   at least one organic polycarboxylic acid containing at least three carboxyl groups,
   at least one esterification catalyst,
   at least one plasticizer, and
   at least one thickener selected from a group consisting of cellulose derivatives, succinoglycans and xanthans.

2. The composition as claimed in claim 1, wherein the polyglycerol is a glycerol oligomer having a degree of polymerization of between 2 and 20.

3. The composition as claimed in claim 2, wherein the polyglycerol is diglycerol or a mixture of polyglycerols containing at least 50% by weight of diglycerol, triglycerol and tetraglycerol.

4. The composition as claimed in claim 1, wherein the polyglycerol represents 20% to 50% of the total weight of the solids.

5. The composition as claimed in claim 1, wherein the organic polycarboxylic acid contains 3 or 4 carboxyl groups.

6. The composition as claimed in claim 5, wherein the organic polycarboxylic acid is selected from a group consisting of citric acid, tricarballylic acid, 1,2,4-butanetricarboxylic acid, aconitic acid, hemimellitic acid, trimellitic acid and trimesic acid, 1,2,3,4-butanetetracarboxylic acid (BTCA) or pyromellitic acid.

7. The composition as claimed in claim 1, wherein the organic polycarboxylic acid represents 15% to 40% of the total weight of the solids.

8. The composition as claimed in claim 1, wherein the organic polycarboxylic acid represents 20% to 70% of the weight of the mixture formed by the polyglycerol and the organic polycarboxylic acid.

9. The composition as claimed in claim 1, wherein the esterification catalyst is sodium hypophosphite.

10. The composition as claimed in claim 1, wherein the esterification catalyst represents 2% to 10% of the total weight of the solids.

11. The composition as claimed in claim 1, wherein the plasticizer is a dialkyl ester of a fatty acid, a diester of isosorbide and fatty acid(s), an acetylated monoglyceride of a hydroxylated fatty acid, or a dimer-based polyester polyol.

12. The composition as claimed in claim 1, wherein the plasticizer represents 5% to 40% of the total weight of the solids.

13. The composition as claimed in claim 1, wherein the thickener is carboxyalkyl cellulose or hydroxyalkyl cellulose.

14. The composition as claimed in claim 1, wherein the thickener represents 2% to 20% of the total weight of the solids.

15. A paintable cloth comprising inorganic and/or organic yarns and the composition as claimed in claim 1.

16. The paintable cloth as claimed in claim 15, wherein the inorganic yarns are made of glass and the organic yarns are formed of at least one polymer or are made of plant fibers.

17. The paintable cloth as claimed in claim 15, wherein the paintable cloth has a surface weight of between 30 and 1000 g/m$^2$.

18. The paintable cloth as claimed in claim 17, wherein the composition represents 15% to 40% of the weight of the paintable cloth.

* * * * *

UNITED STATES PATENT AND TRADEMARK OFFICE
CERTIFICATE OF CORRECTION

PATENT NO. : 10,458,051 B2
APPLICATION NO. : 16/069042
DATED : October 29, 2019
INVENTOR(S) : Alexandre Garcia et al.

Page 1 of 1

It is certified that error appears in the above-identified patent and that said Letters Patent is hereby corrected as shown below:

On the Title Page

Item (30), the Foreign Application Priority Data is missing. Item (30) should read:
--(30) Foreign Application Priority Data
Jan. 13, 2016   (FR).........................1650244--

Signed and Sealed this
Twenty-fourth Day of December, 2019

Andrei Iancu
*Director of the United States Patent and Trademark Office*